Figure 1:
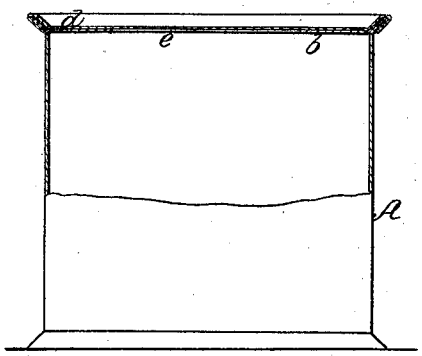
Figure 4:
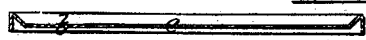
Figure 3:
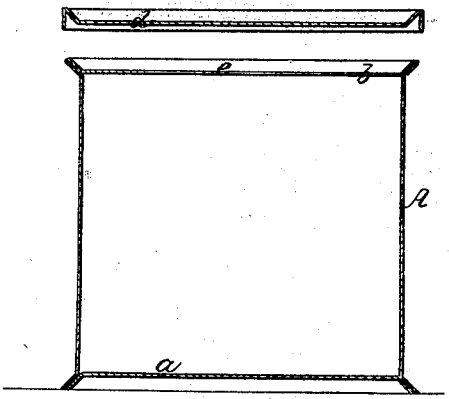
Figure 5:
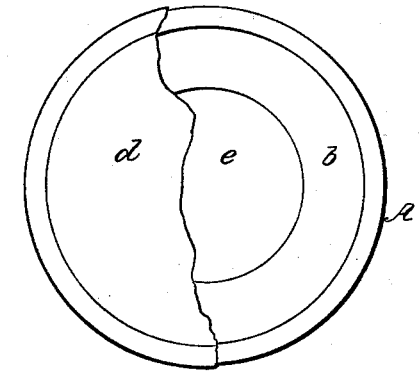
Figure 2:
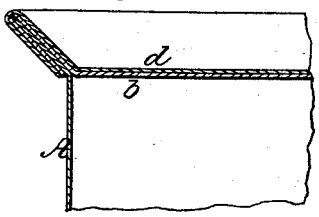

United States Patent Office.

JOHN LONGANECKER, OF NEW PITTSBURG, OHIO.

*Letters Patent No. 77,898, dated May 12, 1868.*

IMPROVEMENT IN STUMP-EXTRACTOR.

*The Schedule referred to in these Letters Patent and making part of the same.*

TO ALL WHOM IT MAY CONCERN:

Be it known that I, JOHN LONGANECKER, of New Pittsburg, in the county of Wayne, and State of Ohio, have invented certain new and useful Improvements in Machines for Extracting Stumps; and I do hereby declare that the following is a full, clear, and exact description thereof, reference being had to the accompanying drawings, and to the letters of reference marked thereon, which form a part of this specification, and which represent a view in perspective of my improved stump-extractor, as attached to a stump for the purpose of uprooting it.

The object of my invention is to provide a machine, which, by the application of a moderate power, will uproot and dislodge stumps of trees from the ground; and, to this end, my improvement consists in so connecting the shaft to which the power is applied, by a system of gearing and pulleys, to the lever which removes the stump, that a moderate power acting on the shaft will overcome great resistance in the stump.

In the accompanying drawing, A represents a stout frame, to which the parts are attached. A shaft, B, revolves in suitable bearings in the frame, and has secured, upon its upper part, a socket, $b$, which receives one end of the tongue C, to the other end of which the horse is attached. This shaft has a small gear-wheel, $b'$, upon it, which engages a large gear, $d$, upon the shaft of the windlass D. One end of the rope $d^2$ is attached to the windlass, and the other end to the frame of the machine. The rope passes through the blocks E and F. The block E contains a fixed pulley, and the block F two movable ones. The lever G has a ring on one end, to which the hook $f$ on the block F is connected. A chain, $g$, attached to the other end of the lever, is passed around the stump to be extracted, and is fastened to a projecting root, by the hook $g^1$. The inclined braces $a$ pivoted to the frame are used for fastening the machine into the earth when the power is applied.

The operation of the stump-extractor is as follows: A horse being attached to the end of the tongue C, turns the shaft B, which, by the gears $b'$ and $d$, gives motion at reduced speed to the windlass D, which, in its revolution, winds the rope $d^2$. The power acting on the rope at the windlass is quadrupled by the movable pulleys in the block F, and, acting on the stump by the lever G and chain $g$, uproots and tears it from the ground.

What I claim, and desire to secure by Letters Patent, is—

The combination of the tongue C, gears $b'$ and $d$, windlass D, rope $d^2$, pulleys E and F, and lever G, with the frame A and braces $a$, when arranged and operating as and for the purpose set forth.

In testimony that I claim the foregoing as my own, I affix my signature in presence of two witnesses.

JOHN LONGANECKER.

Witnesses:
HENRY LEHMAN,
A. E. LEHMAN.

J. McCoy,
Metal Cans for Alkali.

No. 77,899.   Patented Mar. 12, 1868.

Witnesses:
Wm. Albert Steel
S. H. Hossie Godwry

Inventor:
J. McCoy
By his Atty
H. Howson